(12) United States Patent
Shim et al.

(10) Patent No.: US 9,491,245 B2
(45) Date of Patent: Nov. 8, 2016

(54) SYSTEM AND METHOD FOR NETWORK MANAGEMENT USING EXTENSIBLE MARKUP LANGUAGE

(71) Applicants: Choon B. Shim, Ijamsville, MD (US); Dongwook Shin, Potomac, MD (US)

(72) Inventors: Choon B. Shim, Ijamsville, MD (US); Dongwook Shin, Potomac, MD (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 13/863,274

(22) Filed: Apr. 15, 2013

(65) Prior Publication Data

US 2013/0297762 A1    Nov. 7, 2013

Related U.S. Application Data

(63) Continuation of application No. 11/023,629, filed on Dec. 29, 2004, now abandoned.

(51) Int. Cl.
*G06F 15/173* (2006.01)
*H04L 29/08* (2006.01)
*H04L 12/24* (2006.01)

(52) U.S. Cl.
CPC .......... *H04L 67/16* (2013.01); *H04L 41/0213* (2013.01); *H04L 41/0226* (2013.01)

(58) Field of Classification Search
USPC ....... 709/220, 223, 226, 202, 224, 228, 249, 709/229, 203, 217, 219, 232, 238; 707/715, 707/999.104, 705; 715/239, 501.1, 234; 717/121, 168; 379/120
See application file for complete search history.

(56) References Cited

U.S. PATENT DOCUMENTS

| 6,018,567 A * | 1/2000 | Dulman .............. H04M 3/2254 379/120 |
| 6,901,410 B2 * | 5/2005 | Marron et al. ......... 707/999.104 |
| 7,234,109 B2 * | 6/2007 | Atkinson ...................... 715/239 |
| 7,277,929 B2 * | 10/2007 | Ohara ............... G06F 17/30864 709/229 |
| 7,315,852 B2 * | 1/2008 | Balmin et al. ................ 707/715 |
| 7,370,032 B2 * | 5/2008 | Lehnert ................. G06F 17/243 |
| 7,454,696 B2 * | 11/2008 | Kuznetsov et al. .......... 715/239 |
| 7,627,658 B2 * | 12/2009 | Levett et al. ................ 709/223 |
| 7,657,832 B1 * | 2/2010 | Lin ..................... G06F 17/2247 715/234 |
| 7,673,048 B1 * | 3/2010 | O'Toole et al. ............. 709/226 |
| 7,831,905 B1 * | 11/2010 | Jennings ............... G06F 17/227 707/705 |
| 2002/0032790 A1 | 3/2002 | Linderman |
| 2002/0078134 A1 * | 6/2002 | Stone ................ G06F 17/30864 709/202 |
| 2002/0161873 A1 * | 10/2002 | McGuire ............. H04L 41/0213 709/223 |
| 2002/0176404 A1 | 11/2002 | Girard |
| 2003/0059038 A1 | 3/2003 | Meyerson et al. |

(Continued)

OTHER PUBLICATIONS

"U.S. Appl. No. 11/023,629 , Response filed Jul. 15, 2011 to Non Final Office Action mailed Apr. 15, 2011", 9 pgs.

(Continued)

*Primary Examiner* — Quang N Nguyen

(57) ABSTRACT

The invention relates to a system and method for management of an IP network using eXtensible Markup Language (XML) or a similar protocol in addition to SNMP or other managed-device protocol. In embodiments of the invention, a XML-formatted request for data is received, where the data is associated with a Voice over IP (VoIP) device. A device IP address in a first argument and a Xpath query in a second argument are specified, where the device IP address and the Xpath query are based on the XML-formatted request. A Management Information Base (MIB) variable is identified based on the Xpath query.

16 Claims, 11 Drawing Sheets

(56) References Cited

U.S. PATENT DOCUMENTS

| | | | |
|---|---|---|---|
| 2003/0069960 A1* | 4/2003 | Symons | H04L 41/085 709/224 |
| 2003/0105881 A1* | 6/2003 | Symons | H04L 29/06 709/249 |
| 2004/0221026 A1* | 11/2004 | Dorland | 709/223 |
| 2005/0086584 A1* | 4/2005 | Sampathkumar et al. | 715/501.1 |
| 2005/0091346 A1* | 4/2005 | Krishnaswami et al. | 709/220 |
| 2005/0114851 A1* | 5/2005 | Watson-Luke et al. | 717/168 |
| 2005/0160175 A1* | 7/2005 | Ho | H04L 12/66 709/228 |
| 2005/0204022 A1 | 9/2005 | Johnston et al. | |
| 2006/0036723 A1 | 2/2006 | Yip et al. | |
| 2006/0123393 A1* | 6/2006 | Atkins et al. | 717/121 |

OTHER PUBLICATIONS

"U.S. Appl. No. 11/023,629, Advisory Action mailed Feb. 20, 2009", 3 pgs.

"U.S. Appl. No. 11/023,629, Examiner Interview Summary mailed Apr. 15, 2011", 3 pgs.

"U.S. Appl. No. 11/023,629, Final Office Action mailed Jun. 10, 2010", 23 pgs.

"U.S. Appl. No. 11/023,629, Final Office Action mailed Nov. 15, 2012", 11 pgs.

"U.S. Appl. No. 11/023,629, Final Office Action mailed Dec. 8, 2008", 3 pgs.

"U.S. Appl. No. 11/023,629, Final Office Action Mailed Dec. 12, 2011", 10 pgs.

"U.S. Appl. No. 11/023,629, Non Final Office Action mailed Apr. 15, 2011", 15 pgs.

"U.S. Appl. No. 11/023,629, Non-Final Office Action mailed May 29, 2009", 9 pgs.

"U.S. Appl. No. 11/023,629, Non-Final Office Action mailed Jun. 25, 2008", OARN, 12 pgs.

"U.S. Appl. No. 11/023,629, Notice of Non-Compliant Amendment mailed Jan. 26, 2010", 4 pgs.

"U.S. Appl. No. 11/023,629, Response filed Feb. 9, 2009 to Final Office Action mailed Dec. 8, 2008", 11 pgs.

"U.S. Appl. No. 11/023,629, Response filed Feb. 25, 2008 to Restriction Requirement mailed Feb. 6, 2008", 7 pgs.

"U.S. Appl. No. 11/023,629, Response filed Feb. 25, 2010 to Notice of Non-Compliant Amendment mailed Jan. 26, 2010", 9 pgs.

"U.S. Appl. No. 11/023,629, Response filed Sep. 29, 2009 to Non Final Office Action mailed May 29, 2009", 10 pgs.

"U.S. Appl. No. 11/023,629, Response filed Nov. 3, 2010 to Final Office Action mailed Jun. 10, 2010", 11 pgs.

"U.S. Appl. No. 11/023,629, Response filed Aug. 29, 2008 to Non-Final Office Action mailed Jun. 25, 2008", 9 pgs.

"U.S. Appl. No. 11/023,629, Restriction Requirement mailed Feb. 6, 2008", 5 pgs.

"U.S. Appl. No. 11/023,629, Response filed Jun. 12, 2012 to Non Final Office Action mailed Dec. 12, 2011", 9 pgs.

"XNMP—XML Network Management Protocol and Interface", SBC Technology Resources, Inc., V 0. 2, 9 pgs.

Oh, et al., "", Interaction Translation Methods for XMLISNMP Gateway, (Jul. 11, 2003).

* cited by examiner

```
...
<xsd:element name="dot1dTpFdbPort">
<xsd:complexType>
 <xsd:simpleContent>
  <xsd:extension base="xsd:integer">
   <xsd:attribute name="oid" type="xsd:string" use="optional"
        fixed="1.3.6.1.2.1.17.4.3.1.2" />
   <xsd:attribute name="varSnmpUri" type="xsd:string" use="optional" />
   <xsd:attribute name="objectSyntax" type="xsd:string" use="optional"
        fixed="INTEGER" />
   <xsd:attribute name="accessMode" type="xsd:string" use="optional"
fixed="read-only" />
  </xsd:extension>
 </xsd:simpleContent>
</xsd:complexType>
</xsd:element>
...
```

FIG. 6

```
<?xml version="1.0" ?>
<xsl:stylesheet version="1.1"
        xmlns:xsl="http://www.w3.org/1999/XSL/Transform">

<xsl:template match="VarBindList">
<List>
        <xsl:apply-templates select="VarBind" >
                <xsl:sort data-type="number" select="@value"/>
        </xsl:apply-templates>
</List>
</xsl:template>
<xsl:template match="VarBind">
<xsl:choose>
<xsl:when test="(position() = 1) or not(current()/@value = preceding::VarBind/@value)">
<Port>
<xsl:attribute name = "number">
<xsl:value-of select = "@value" />
</xsl:attribute>
</Port>
<Item>
<xsl:attribute name = "macAddr">
<xsl:value-of select = "@index" />
</xsl:attribute>
</Item>
</xsl:when>
<xsl:otherwise>
<Item>
<xsl:attribute name = "macAddr">
<xsl:value-of select = "@index" />
</xsl:attribute>
</Item>
</xsl:otherwise>
</xsl:choose>
</xsl:template>
</xsl:stylesheet>
```

FIG. 9

```
SNMPv2 - SMI::mib - 2.17.4.3.1.2.0.0.14.255.5.39 = INTEGER: 24
SNMPv2 - SMI::mib - 2.17.4.3.1.2.0.1.230.146.241.37 = INTEGER: 4
SNMPv2 - SMI::mib - 2.17.4.3.1.2.0.2.138.53.150.84 = INTEGER: 24
SNMPv2 - SMI::mib - 2.17.4.3.1.2.0.2.138.53.167.79 = INTEGER: 2
SNMPv2 - SMI::mib - 2.17.4.3.1.2.0.2.138.54.34.185 = INTEGER: 2
SNMPv2 - SMI::mib - 2.17.4.3.1.2.0.2.138.54.76.76 = INTEGER: 2
SNMPv2 - SMI::mib - 2.17.4.3.1.2.0.2.138.79.161.236 = INTEGER: 16
SNMPv2 - SMI::mib - 2.17.4.3.1.2.0.4.95.0.57.81 = INTEGER: 2
SNMPv2 - SMI::mib - 2.17.4.3.1.2.0.4.95.0.57.85 = INTEGER: 2
```
~ 1005

```
<VarBindList>
<VarBind index="0.1.230.146.241.37" name="" oid="" value="4"/>
<VarBind index="0.2.138.53.167.79" name="" oid="" value="2"/>
<VarBind index="0.2.138.54.34.185" name="" oid="" value="2"/>
<VarBind index="0.2.138.54.49.129" name="" oid="" value="2"/>
<VarBind index="0.2.138.54.75.187" name="" oid="" value="2"/>
...
```
~ 1010

```
<List>
<Port number="2"/>
<Item macAddr="0.2.138.53.167.79"/>
<Item macAddr="0.2.138.54.34.185"/>
<Item macAddr="0.2.138.54.49.129"/>
<Item macAddr="0.2.138.54.75.187"/>
...
<Port number="4"/>
<Item macAddr="0.1.230.146.241.37"/>
<Port number="6"/>
...
```
~ 1015

FIG. 10

SYSTEM AND METHOD FOR NETWORK MANAGEMENT USING EXTENSIBLE MARKUP LANGUAGE

RELATED APPLICATION

This application is a continuation of and claims the benefit of priority under 35 U.S.C. §120 to U.S. application Ser. No. 11/023,629, filed Dec. 29, 2004, the entire contents of which is incorporated herein by reference.

FIELD OF INVENTION

The invention relates generally to the field of communications. More specifically, but not by way of limitation, the invention relates to a system and method for management of a Voice Over Internet Protocol (VoIP) or other Internet Protocol (IP) network using eXtensible Markup Language (XML).

BACKGROUND

Voice over Internet Protocol (VoIP) is an alternative to circuit-committed protocols such as Time Division Multiplexing (TDM) that are used on conventional Public Switched Telephone Networks (PSTN's). With VoIP, voice communications share the same network with data, effectively consolidating bandwidth by sending packets to any available path at any given time. Monitoring and managing a VoIP network requires a network protocol to communicate with, and gather information from, numerous Internet Protocol (IP) network devices.

FIG. 1 is a block diagram of a functional architecture of a communications network, according to the prior art. As shown in FIG. 1, a network management system 105 is coupled to managed devices 110, 115, 120, and 125 via links 130, 135, 140, and 145, respectively. In general, the managed devices may be routers, switches, call servers, gateways, gatekeepers, handsets, Multipoint Control Units (MCU's), Session Initiation Protocol (SIP) proxy servers, or other devices. As illustrated, links 130, 135, 140, and 145 utilize Simple Network Management Protocol (SNMP).

SNMP has many disadvantages, however. For example, SNMP is limited to five management commands: "get" to request values from the Management Information Base (MIB) of a managed device; "get next" to request the successive values from the MIB; "get response" to retrieve the answer returned; "set" to update MIB values; and "trap" to send an event notification. Moreover, SNMP information is presented in long unstructured data strings. The limited command set and unwieldy data formats associated with SNMP result in increased cost and cycle time for the development and maintenance of IP network management systems. Moreover, the processing overhead for SNMP-based network management systems may be substantial, making them unsuitable for VoIP and other network communications that must operate in near real-time with low packet losses. A more robust management protocol is needed for time-sensitive IP network applications.

SUMMARY OF THE INVENTION

The invention relates to a system and method for management of an IP network using eXtensible Markup Language (XML) or a similar protocol in addition to SNMP or other managed-device protocol. In embodiments of the invention, an XML Network Management Protocol (XNMP) gateway is coupled between the network management system and one or managed devices. The XNMP gateway performs transformations so that the link between the network management system and XNMP gateway uses XML or a similar protocol, and the links between the XNMP gateway and managed devices use SNMP or other local protocol. Advantageously, XML is more flexible and robust than SNMP, resulting in improved processing efficiencies at the network management system.

Embodiments of the invention provide a method for managing a network, including: receiving an eXtensible Mark-up Language (XML)-formatted request for data, the data associated with a managed Voice over IP (VoIP) device; transforming the XML-formatted request to a Simple Network Management Protocol (SNMP)-formatted command; and receiving an SNMP-formatted result based on the SNMP-formatted command.

Embodiments of the invention provide a method for processing data, including: receiving an eXtensible Mark-up Language (XML)-formatted request for data, the data associated with a managed Voice over IP (VoIP) device; specifying a device IP address in a first argument and a Xpath query in a second argument, the device IP address and the Xpath query based on the XML-formatted request; and identifying a Management Information Base (MIB) variable based on the Xpath query.

Embodiments of the invention provide a method for processing data, including: receiving Simple Network Management Protocol (SNMP) data; marking up the SNMP data based on an eXtensible Markup Language (XML) schema; and converting the SNMP data to XML-formatted data.

Embodiments of the invention also provide computer-readable medium for performing the foregoing methods.

Embodiments of the invention provide a system configured to manage a network, including: a network management system; an eXtensible Network Management Protocol (XNMP) gateway coupled to the network management system; and at least one managed Voice over IP (VoIP) device coupled to the XNMP gateway, the XNMP gateway configured to receive an eXtensible Markup language (XML) request from the network management system, the XNMP gateway further configured to transform the XML request into an Simple Network Management Protocol (SNMP) command, the XNMP gateway further configured to send the SNMP to the at least one managed VoIP device.

The features and advantages of the invention will become apparent from the following drawings and detailed description.

BRIEF DESCRIPTION OF THE DRAWINGS

Embodiments of the invention are described with reference to the following drawings, wherein:

FIG. 6 is an illustration of XML schema code, according to an embodiment of the invention;

FIG. 9 is an illustration of eXtensible Style sheet Language (XSL) code, according to embodiment of the invention;

FIG. 10 is an illustration of process output data formats, according to an embodiment of the invention;

DETAILED DESCRIPTION

This section provides an overview of an exemplary system and method for managing IP networks. More detailed disclosure is provided for transformation from XML to SNMP, and for transformation from SNMP to XML. A functional architecture for an exemplary XNMP gateway is also provided. Sub-headings are used below for organizational convenience. The disclosure of any particular feature is not necessarily limited to any particular section, however.

Overview

Figure 1:
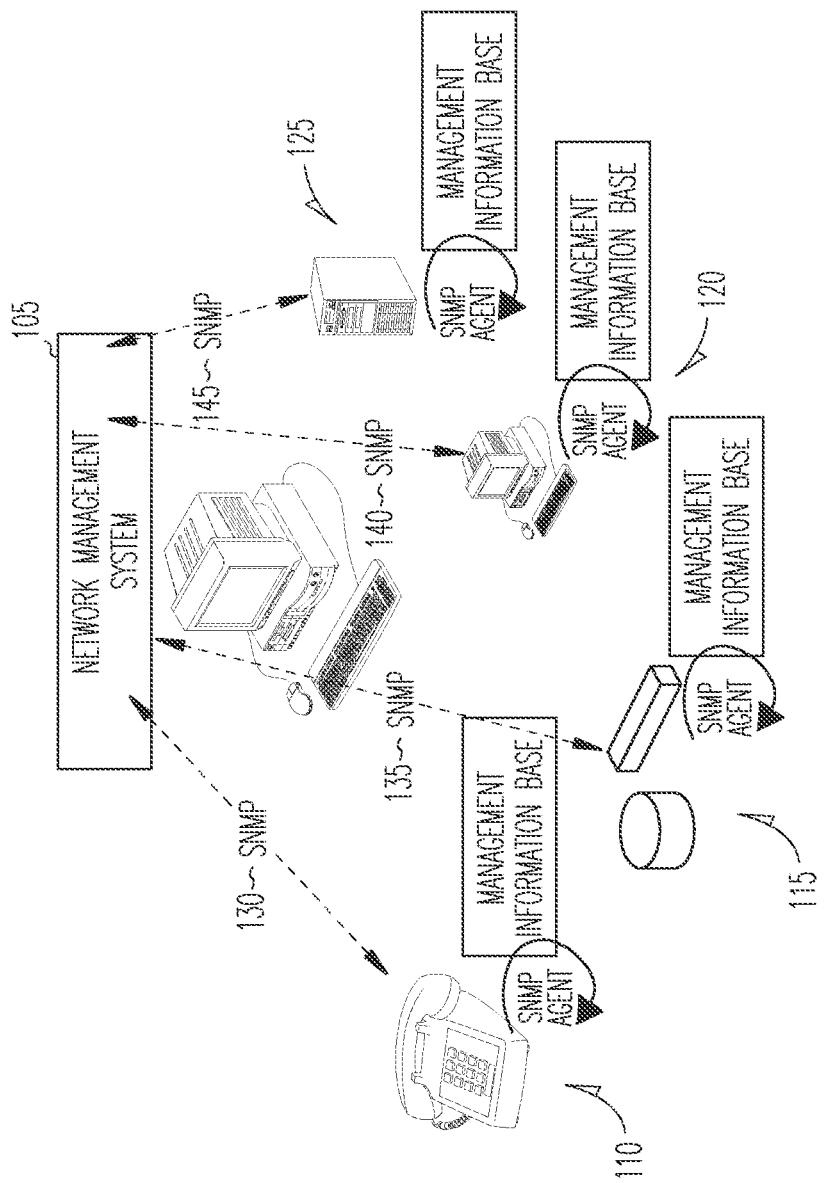
FIG. 1 is a block diagram of a functional architecture of a communications network, according to the prior art.
Figure 2:
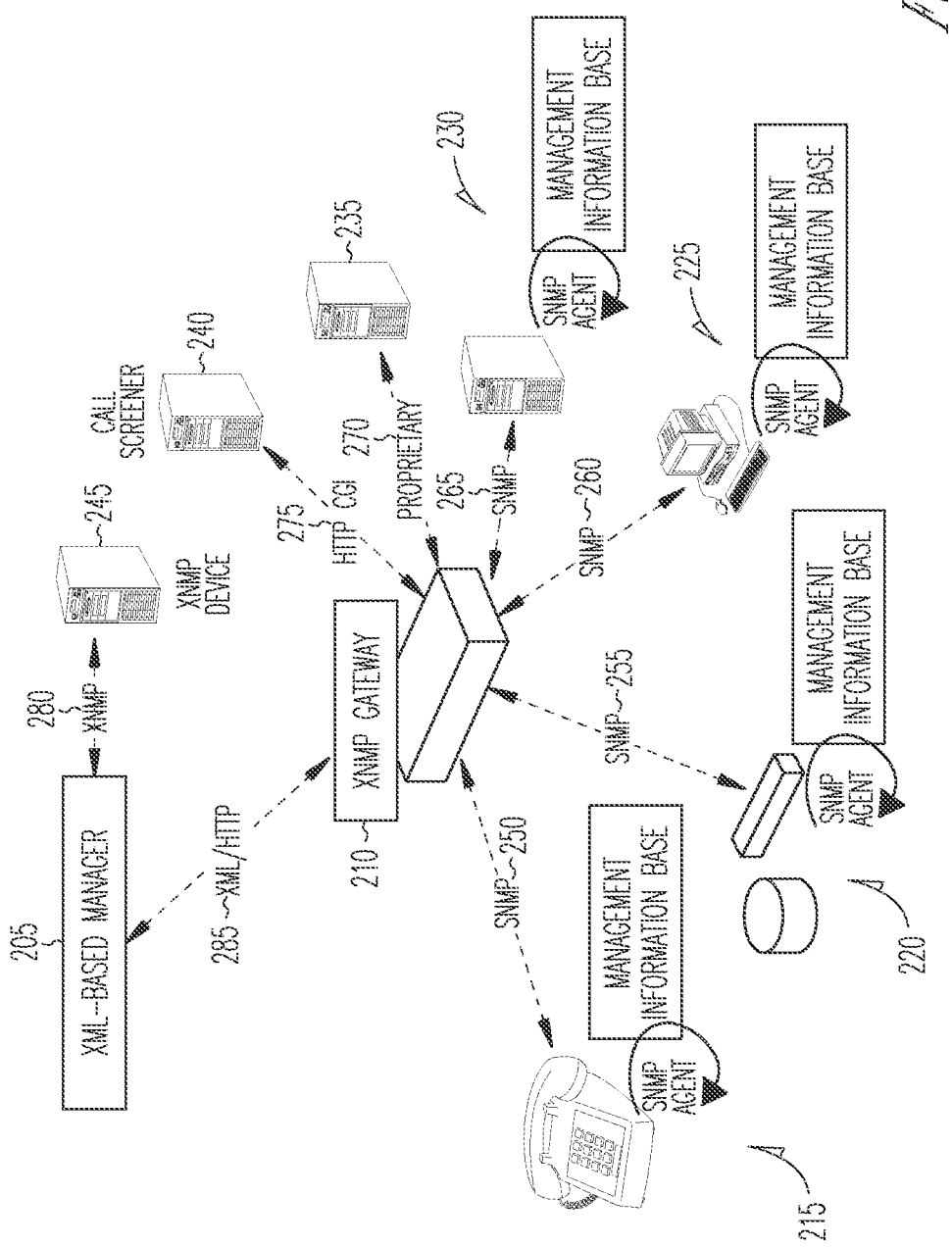
FIG. 2 is a block diagram of a functional architecture of a communications network having a XNMP gateway, according to an embodiment of the invention.

FIG. 2 is a block diagram of a functional architecture of a communications network having a XNMP gateway, according to an embodiment of the invention. As shown therein, a network management system 205 is coupled to a XNMP gateway 210 via link 285. In turn, the XNMP gateway 210 is coupled to managed devices 215, 220, 225, 230, 235 and 240 via links 250, 255, 260, 265, 270 and 275, respectively. Managed device 245 is directly coupled to the network management system 205 via link 280.

In the illustrated embodiment, the network management system 205 may be or include, for example, a personal computer, network server, or other networked device or system configured to perform administrative functions such as issuing commands, processing received information, and/ or displaying information. The XNMP gateway 210 is configured to perform protocol transformations between the network management system 205 and the managed devices 215, 220, 225, 230, 235, and 240. The managed devices 215, 220, 225, 230, 235, 240, and 245 may be or include, for instance, routers, switches, call servers, gateways, gatekeepers, handsets, Multipoint Control Units (MCU's), Session Initiation Protocol (SIP) proxy servers, or other network devices.

In the illustrated embodiment, managed devices 215, 220, 225, and 230 each include a Management Information Base (MIB) and a SNMP agent. The MIB stores objects that relate to the status of the managed device. The SNMP agent updates the stored objects, is responsive to status requests from the network management system 205, and may also issue alerts to the network management system 205.

In the illustrated embodiment, links 250, 255, 260, and 265 utilize SNMP, link 270 utilizes a proprietary protocol, link 275 utilizes Hyper-Text Transfer Protocol (HTTP) Common Gateway Interface (CGI), link 280 utilizes XNMP, and link 285 utilizes either XML over HTTP. The XNMP gateway 210 provides transformations between SNMP and XML, and between proprietary protocols and XML.

In the illustrated embodiment, the XNMP gateway 210 removes presentation information from the HTTP CGI formatted data received from the call server 240 to transform the HTTP CGI data to XML format. Because managed device 245 communicates via XNMP, managed device 245 is linked directly to the network management system 205 via link 280 without being routed through the XNMP gateway 210.

The functional architecture presented in FIG. 2 can be varied according to design choice. For instance, the type and quantity of managed devices will vary according to application needs. In addition, other implementations may use more than one network management system and/or more than one XMNP gateway to monitor a single network. In other embodiments, the functions of the network management system and the XNMP gateway can be combined into a single functional component.

Exemplary transformations between SNMP and XML are described below with reference to FIG. 3. A benefit of using XML protocol for communications with the network management system 205 is discussed below with reference to FIG. 4.

Figure 3:
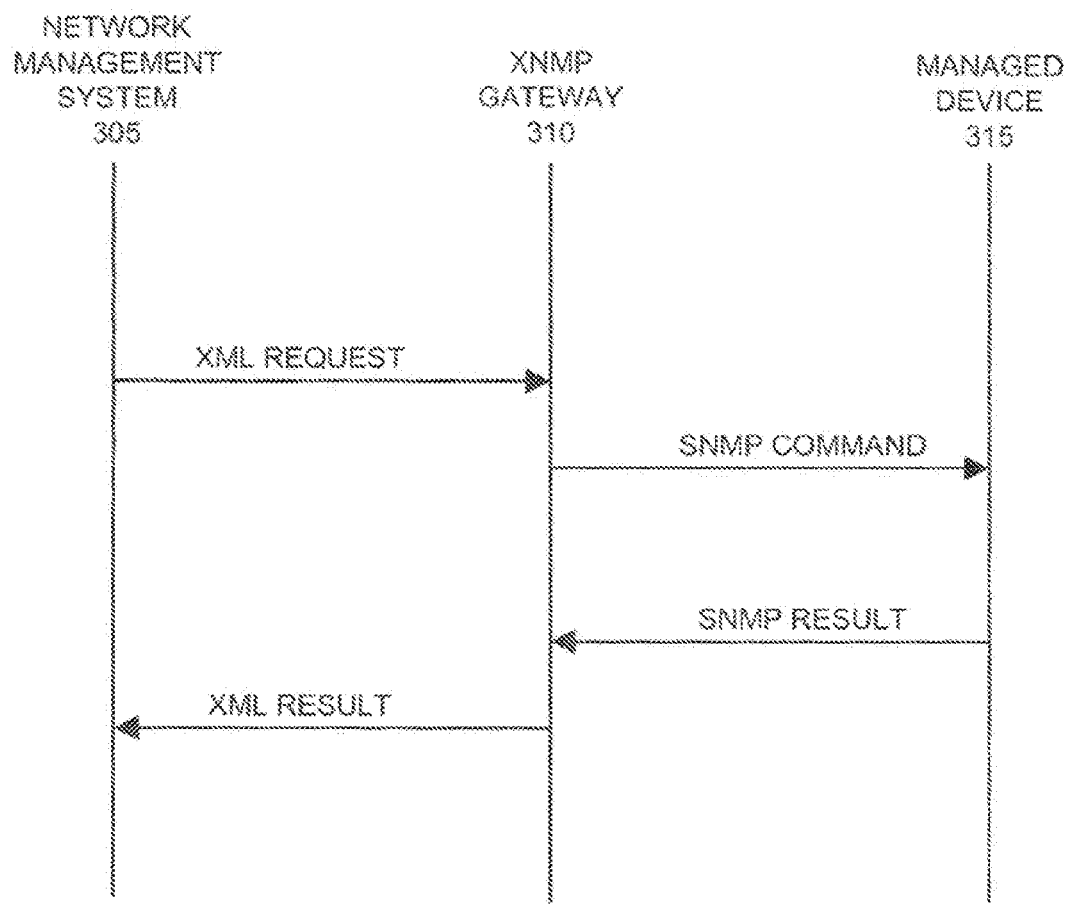
FIG. 3 is a message sequence diagram of communications between a network management system, an XNMP gateway, and a managed device, according to an embodiment of the invention.

FIG. 3 is a message sequence diagram of communications between a network management system 305, an XNMP gateway 310, and a managed device 315, according to an embodiment of the invention. As illustrated in FIG. 3, the network management system 305 sends an XML request to the XNMP gateway 310. In response, the XNMP gateway 310 transforms the XML request to a SNMP command and sends the SNMP command to the managed device 315. The managed device 315 sends a SNMP response to the XNMP gateway 310. The XNMP gateway 310 transforms the SNMP response into an XML result. Finally, the XNMP gateway 310 sends the XML result to the network management system 305.

The messaging sequence illustrated in FIG. 3 may be varied according to application requirements. For example, in some embodiments, a single XNMP gateway will communicate with multiple managed devices. Further, a message may be initiated by the managed device 315; for example, a SNMP agent in managed device 315 could send an SNMP message to the XNMP gateway 310 as a result of an alert condition determined by the SNMP agent. Moreover, although SNMP messages are shown between the XNMP gateway 310 and the managed device 315, other messaging protocols, such as a proprietary vendor protocol, may also be used between these two functional blocks. Preferably, XML messaging or a similar protocol is used between the XNMP gateway 310 and the management system 305, for reasons discussed below with reference to FIG. 4.

Figure 4:
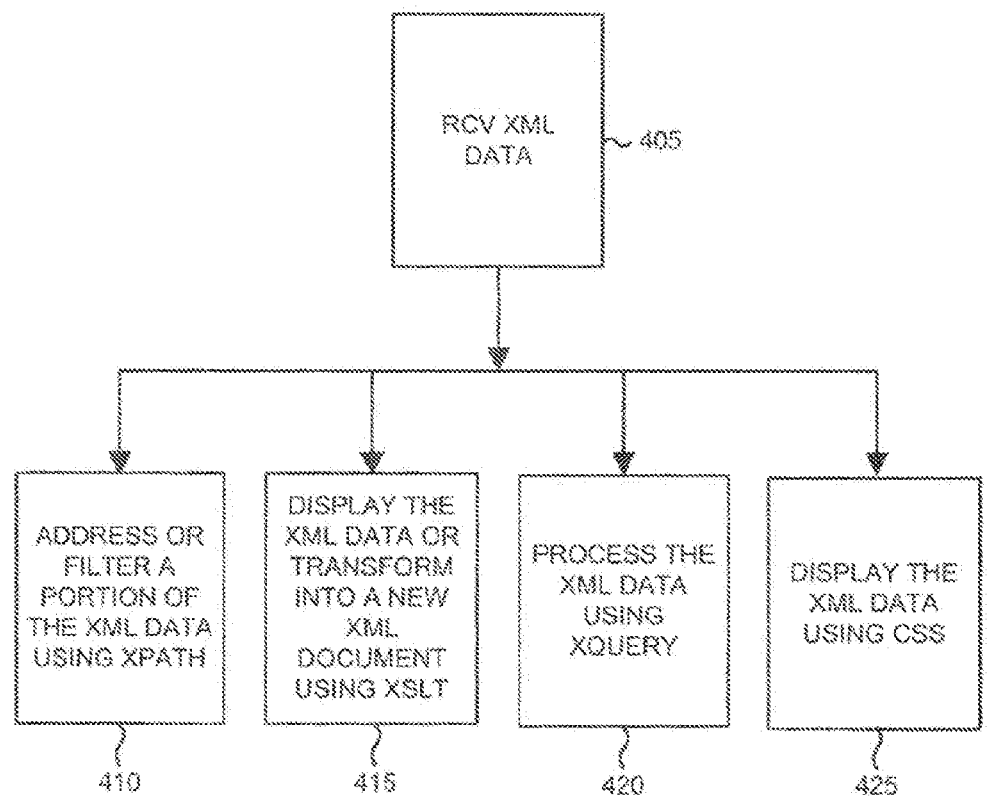
FIG. 4 is a flow diagram of XML processing, according to an embodiment of the invention.

FIG. 4 is a flow diagram of XML processing, according to an embodiment of the invention. As shown in FIG. 4, various processes can begin by receiving an XML message in step 405. Subsequent steps 410, 415, 420, and 425 may be performed in combination or in the alternative. In particular, a portion of the XML data may be addressed or filtered using Xpath in step 410. The XML data can be displayed or transformed into a new XML document via an XML Style sheet Transformation (XSLT) in step 415. The XML data may be processed using Xquery (a more generalized version of Xpath) in step 420. Finally, the XML data can be displayed using Cascading Style Sheets (CSS) in step 425.

Accordingly, a variety of powerful and flexible tools exist to process received XML data. Using XML at the network management system may therefore result in decreased development time and maintenance expense. Moreover, because run-time overhead can also be reduced compared to a pure SNMP-based system, a network management system using XML may better support application environments such as VoIP that require near real-time performance.

In embodiments of the invention, Xpath process 410 and/or Xquery process 420 are executed in the XNMP gateway 210 to transform an XML request into an SNMP command, and XSLT process 415 is used in the XNMP gateway 210 to transform an SNMP result into an XML result. CSS process 425 may optionally be used to display at least a portion of the XML result at the network management system 205.

XML-to-SNMP Transformation

Figure 5:
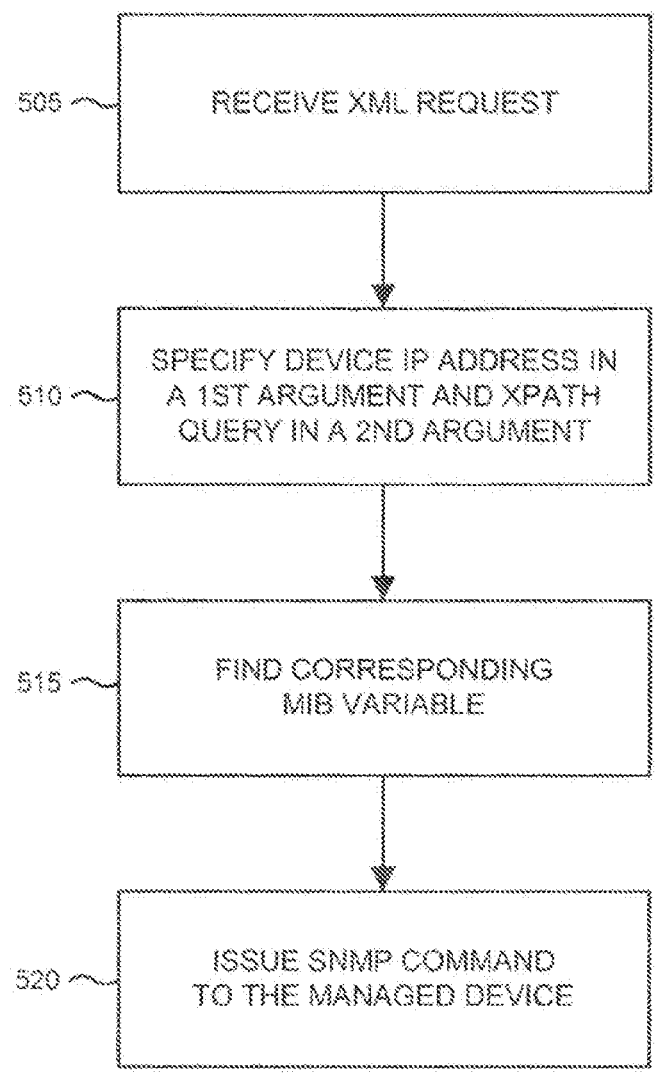
FIG. 5 is a flow diagram of a XML transformation process, according to an embodiment of the invention.

FIG. 5 is a flow diagram of a XML transformation process, according to an embodiment of the invention. As shown in FIG. 5, the process begins in step 505 by receiving an XML request, for example from a network management system. Next, in step 510, the process specifies a device IP address in a first argument and an Xpath (or Xquery) query in a second argument. Both the target IP address and the Xpath (or Xquery) query are based on the XML request. Next, the process finds corresponding MIB variables in step 515. Finally, in step 520, the process issues an SNMP command to the managed device.

In executing step 510, interface code such as "helper.getsnmp( )" may be used to specify the address and Xpath query. For example, the form of an output from step 510 may be "helper.getsnmp(10.10.1.221,//dot1dTpFdbPort)" where "10.10.1.221" is the target IP address and "dot1dTpFdbPort" is the Xpath query. Requests received in step 505 may require that MIB variables associated with phone number, voice quality, phone status, or other information is specified in step 510 in the alternative to, or in combination with, MAC address information.

FIG. 6 is an illustration of XML schema code that may be used in executing step 515, according to an embodiment of the invention. Using the portion of schema shown in FIG. 6, an element name of "dot1dTpFdbPort" (the Xpath query) is associated with MIB variable "1.3.6.1.2.1.17.4.3.1.2." Accordingly, the form of the SNMP command issued in step 520 may be "snmpwalk-c public 10.10.1.221 1.3.6.1.2.1.17.4.3.1.2."

SNMP-to-XML Transformation

Figure 7:
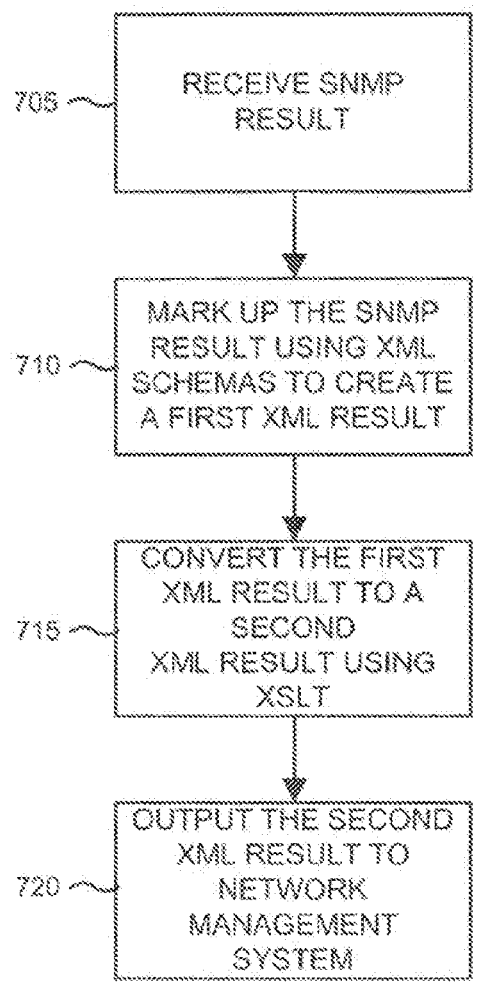
FIG. 7 is a flow diagram of a SNMP transformation process, according to an embodiment of the invention.

FIG. 7 is a flow diagram of a SNMP transformation process, according to an embodiment of the invention. As shown in FIG. 7, the process begins in step 705 by receiving the SNMP result from a managed device. Alternatively, the process could begin by receiving an alert from a SNMP agent in a managed device. Next, in step 710, the process marks up the SNMP result using an XML schema to create a first XML result. Then, in step 715, the process converts the first XML result to a second XML result using an XSLT. The format of the second XML result is predetermined according to application requirements. Finally, the process outputs the second XML result, for example to a network management system, in step 720. Embodiments of the processes in FIG. 7 are described with reference to FIGS. 8-10 below.

Figure 8:
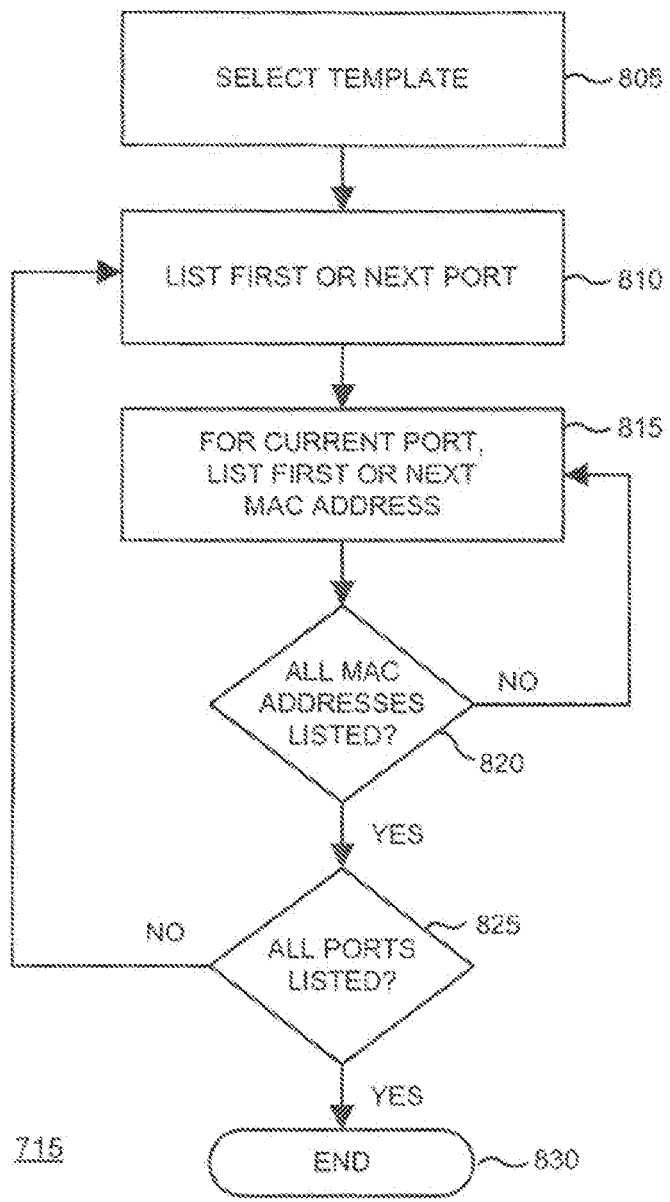
FIG. 8 is a flow diagram of a portion of a XML transformation process, according to an embodiment of the invention.

FIG. 8 is a flow diagram of a portion of a XML transformation process, according to an embodiment of the invention. The process in FIG. 8 is an exemplary embodiment of step 715 in FIG. 7. The process begins by selecting an appropriate template in step 805. Next, the process lists a first or next port in step 810. Then, for the current port, the process lists the first or next Media Access Control (MAC) address in step 815. In conditional step 820, the process determines whether all MAC addresses have been listed. Where the result of conditional step 820 is in the negative, the process returns to step 815 to list an additional MAC address. Where the result of conditional step 820 is in the affirmative, the process advances to conditional step 825 to determine whether all ports have been listed. Where the result of conditional step 825 is in the negative, the process returns to step 810 to list the next port. Where the result of conditional step 825 is in the affirmative, the process terminates in step 830.

Accordingly, FIG. 8 is an embodiment of a process that lists one or more MAC addresses associated with each of one or more ports based on marked-up XML data.

FIG. 9 is an illustration of eXtensible Style sheet Language Transformation (XSLT) code, according to an embodiment of the invention. The XSLT code illustrated in FIG. 9 may be used in executing the conversion process illustrated as step 715 in FIG. 7. The XSLT code illustrated in FIG. 9 executes a process that is substantially similar to the process illustrated in FIG. 8.

The code illustrated in FIG. 9 lists several XSLT elements, including: "xsl:template," which defines a reusable template for generating the desired output for nodes of a predetermined type; "xsl:choose," which provides repeated conditional testing in conjunction with the "xsl:otherwise" and "xsl:when" elements; "xsl:attribute," which creates an attribute node and associates an output with the node; and "xsl:value-of," which inserts the value of the selected node as text. In the illustrated embodiment, a template named "VarBind" is used to list port number attributes and MAC address attributes into a predetermined format. Alternative templates could be selected in step 805 for data received from different types of managed devices.

FIG. 10 is an illustration of process output data formats, according to an embodiment of the invention. The data formats in FIG. 10 relate to process steps illustrated in FIG. 7. In particular, the data in box 1005 is the SNMP result output from receiving step 705, the data in box 1010 is the first XML result output from step 710 and the data in box 1015 is the second XML result output from step 715.

Functional Architecture of an XNMP Gateway

Figure 11:
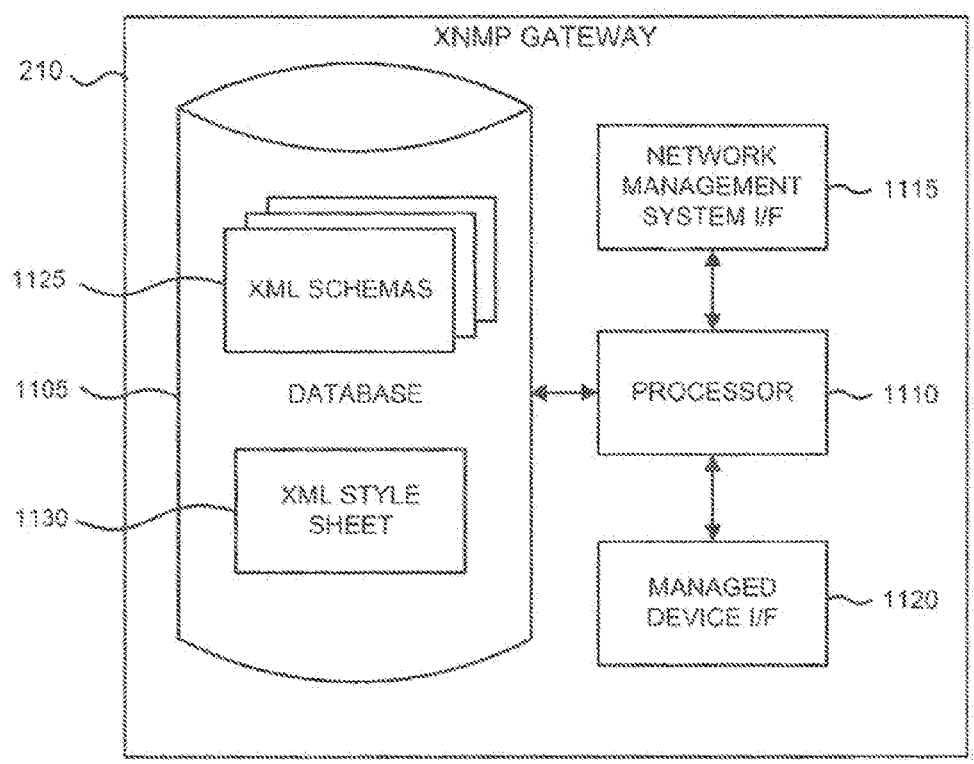
FIG. 11 is a block diagram of a functional architecture of an XNMP gateway, according to an embodiment of the invention.

FIG. 11 is a block diagram of a functional architecture of an XNMP gateway, according to an embodiment of the invention. The architecture illustrated in FIG. 11 is one embodiment of the XNMP gateway 210 shown in FIG. 2.

As shown in FIG. 11, an XNMP gateway 210 includes a database 1105 coupled to a processor 1110. A network management system interface 1115 and a managed device interface 1120 are further coupled to the processor 1110. The database 1105 may be, for example, an eXist database that resides on any processor-readable storage medium. The database 1105 preferably includes multiple XML schemas 1125 and at least one XML style sheet 1130. With reference also to FIG. 2, the network management system interface 1115 may be connected to link 285, and the managed device interface 1120 may be connected to links 250, 255, 260, 265, 270, and 275.

Components of the gateway illustrated in FIG. 11 are preferably configured to execute the processes described above with reference to FIGS. 3-10. For example, in performing a XML-to-SNMP transformation, the processor 1110 may receive a XML request at the network management system interface 1115 and retrieve at least one of the XML schemas 1125 to output a SNMP command via the managed device interface 1120. Likewise, in performing a SNMP-to-XML transformation, the processor 1110 may receive an SNMP result (or alert) at the managed device interface 1120, retrieve at least one XML schema 1125 and the XML style sheet 1130 to output an XML-formatted message at the network management system interface 1115.

CONCLUSION

The invention described above thus overcomes the disadvantages of known systems and methods by inserting a XNMP gateway between the network management system and one or managed devices so that the VoIP network management system operates with XML instead of the more conventional SNMP. While this invention has been described in various explanatory embodiments, other embodiments and variations can be effected by a person of ordinary skill in the art without departing from the scope of the invention. For example, although disclosed embodiments utilize XML at the network management system, other common languages, such as XHTML, could be used so long as the appropriate transformations are performed at the gateway that is connected between the network management system and the managed device(s). Moreover, the invention is not necessarily limited to VoIP applications.

We claim:

1. A method for processing data, comprising:
   receiving, from an eXtensible Mark-up Language (XML)-based network management system, an XML-formatted request for data, the data associated with a Voice over IP (VoIP) device;
   specifying a device IP address in a first argument and a Xpath query in a second argument and that is used to filter a portion of the data, the device IP address and the Xpath query based on the XML-formatted request;
   identifying a Management Information Base (MIB) variable based on a name identifier in the Xpath query;
   issuing a Simple Network Management Protocol (SNMP) command to the VoIP device based on the device IP address and the MIB variable, wherein the issuing includes concatenating the device IP address with the MIB variable to produce the SNMP command; and
   receiving SNMP data, and converting the received SNMP data to XML by:
      marking up the SNMP data based on an XML schema to create a first XML result;
      converting the first XML result to a second XML result based on an eXtensible Style sheet Language Transformation (XSLT) template, the converting including, for each of one or more port numbers, loop operations for listing media access control (MAC) addresses for the port number, including:
         listing a first MAC address;
         determining whether all MAC addresses have been listed; and
         if it is determined that all MAC address have not been listed, listing a next MAC address, and repeating the determining and the listing of the next MAC address until it is determined that all MAC addresses have been listed; and
      outputting the second XML result so as to associate a port number attribute with one or more MAC address attributes.

2. The method of claim 1, the identifying the MIB variable based on a predetermined XML schema.

3. A method for processing data, comprising:
   receiving Simple Network Management Protocol (SNMP) data, the SNMP data associated with a VoIP device;
   marking up the SNMP data based on an eXtensible Markup Language (XML) schema to create a first XML result;
   converting the first XML result to a second XML result based on an eXtensible Style sheet Language Transformation (XSLT) template, the converting including, for each of one or more port numbers, loop operations for listing media access control (MAC) addresses for the port number, including:
      listing a first MAC address;
      determining whether all MAC addresses have been listed; and
      if it is determined that all MAC address have not been listed, listing a next MAC address, and repeating the determining and the listing of the next MAC address until it is determined that all MAC addresses have been listed; and
   outputting the second XML result in a predetermined format, the predetermined format specifying a particular format for associating a port number attribute with one or more MAC address attributes.

4. The method of claim 3, the converting the first XML result is based on an eXtensible Style sheet Language Transformation (XSLT).

5. The method of claim 3, the converting the first XML result to the second XML result further including loop operations for listing ports, including:
   listing a first port number;
   performing the loop operations to list MAC addresses for the first port number;
   determining whether all port numbers have been listed; and
   if it is determined that all port numbers have not been listed, listing a next port number, and repeating the performing the loop operations for listing MAC addresses for the next port number, the determining whether all port numbers have been listed, and the listing of the next port number until it is determined that all port numbers have been listed.

6. The method of claim 3, further comprising outputting the second XML result to a network management system.

7. The method of claim 3, wherein specifying further comprises specifying a phone number, a voice quality, or a phone status associated with the VoIP device in combination with the MAC address.

8. The method of claim 5, wherein the template is selected from a plurality of templates.

9. A non-transitory machine-readable medium having instructions stored thereon for execution by a processor to perform a method comprising:
   receiving, from an eXtensible Mark-up Language (XML)-based network management system, an XML-formatted request for data, the data associated with a Voice over IP (VoIP) device;
   specifying a device IP address in a first argument and a Xpath query in a second argument and that is used to filter a portion of the data, the device IP address and the Xpath query based on the XML-formatted request;
   identifying a Management Information Base (MIB) variable based on a name identifier in the Xpath query;
   issuing a Simple Network Management Protocol (SNMP) command to the VoIP device based on the device IP address and the MIB variable, wherein the issuing includes concatenating the device IP address with the MIB variable to produce the SNMP command; and
   receiving SNMP data, and converting the received SNMP data to XML by:
      marking up the SNMP data based on an XML schema to create a first XML result;
      converting the first XML result to a second XML result based on an eXtensible Style sheet Language Transformation (XSLT) template, the converting including, for each of one or more port numbers, loop operations for listing media access control (MAC) addresses for the port number, including:
  listing a first MAC address;
  determining whether all MAC addresses have been listed; and
  if it is determined that all MAC address have not been listed, listing a next MAC address, and repeating the determining and the listing of the next MAC address until it is determined that all MAC addresses have been listed; and
  outputting the second XML result so as to associate a port number attribute with one or more MAC address attributes.

10. The non-transitory machine-readable medium of claim 9, the identifying the MIB variable based on a predetermined XML schema.

11. A non-transitory machine-readable medium having instructions stored thereon for execution by a processor to perform a method comprising:
  receiving Simple Network Management Protocol (SNMP) data, the SNMP data associated with a VoiP device;
  marking up the SNMP data based on an eXtensible Markup Language (XML) schema to create a first XML result;
  converting the first XML result to a second XML result based on an eXtensible Style sheet Language Transformation (XSLT) template, the converting including, for each of one or more port numbers, loop operations for listing media access control (MAC) addresses for the port number, including:
    listing a first MAC address;
    determining whether all MAC addresses have been listed; and
    if it is determined that all MAC address have not been listed, listing a next MAC address, and repeating the determining and the listing of the next MAC address until it is determined that all MAC addresses have been listed; and
  outputting the second XML result in a predetermined format, the predetermined format specifying a particular format for associating a port number attribute with one or more MAC address attributes.

12. The non-transitory machine-readable medium of claim 11, the converting the first XML result is based on an eXtensible Style sheet Language Transformation (XSLT).

13. The non-transitory machine-readable medium of claim 11, the converting the first XML result to the second XML result further including loop operations for listing ports, including:
  listing a first port number;
  performing the loop operations to list MAC addresses for the first port number;
  determining whether all port numbers have been listed; and
  if it is determined that all port numbers have not been listed, listing a next port number, and repeating the performing the loop operations for listing MAC addresses for the next port number, the determining whether all port numbers have been listed, and the listing of the next port number until it is determined that all port numbers have been listed.

14. The non-transitory machine-readable medium of claim 13, wherein the template is selected from a plurality of templates.

15. The non-transitory machine-readable medium of claim 11, further comprising outputting the second XML result to a network management system.

16. The non-transitory machine-readable medium of claim 11, wherein specifying further comprises specifying a phone number, a voice quality, or a phone status associated with the VoiP device instead of the MAC address.

* * * * *